United States Patent [19]

James et al.

[11] 4,009,353
[45] Feb. 22, 1977

[54] ANALOG SIGNAL DETECTION

[75] Inventors: Randell Leland James; James Thomas Padden, both of Austin, Tex.

[73] Assignee: International Business Machines Corporation, Armonk, N.Y.

[22] Filed: June 23, 1975

[21] Appl. No.: 589,320

[52] U.S. Cl. ............................................ 179/84 VF
[51] Int. Cl.² ......................................... H04M 1/50
[58] Field of Search ........ 179/84 UF; 340/347 AD; 328/138, 139, 137; 324/78 D

[56] References Cited

UNITED STATES PATENTS

| | | | |
|---|---|---|---|
| 3,537,001 | 10/1970 | Friend | 179/84 VF |
| 3,760,269 | 9/1973 | Beeman | 324/78 D |
| 3,790,720 | 2/1974 | Schartmann | 179/84 VF |
| 3,912,869 | 10/1975 | Ullakko | 179/84 VF |
| 3,917,912 | 11/1975 | Niwa | 179/84 VF |

*Primary Examiner*—William C. Cooper
*Assistant Examiner*—Joseph A. Popek
*Attorney, Agent, or Firm*—John L. Jackson

[57] ABSTRACT

Disclosed is a method and apparatus for detecting the presence of signals, particularly touch-tone signals, of characteristic complex waveforms by comparing unknown signals with pre-specified digital formats or "masks" representative of such waveforms. The apparatus includes digital circuitry defining the masks and digital circuitry for counting the number of times during a prescribed time period there is a correlation between the digital format of the unknown signals and the masks.

8 Claims, 5 Drawing Figures

ANALOG SIGNAL DETECTION

This invention pertains to a method and apparatus for selectively detecting electrical signals of known characteristics from a group of signals of unknown characteristics, more particularly to a signal detection system for selectively detecting and indicating the presence of various tone signals generated from a TOUCH-TONE signal generator, and even more particularly to a digital signal detection system.

Within the electronic field, it is often necessary to selectively recognize electrical signals having particular waveform or frequency characteristics from a group or spectrum of signals of unknown characteristics. For example, in telephone communication systems and data processing equipment employing TOUCH-TONE dial inputs, the effective switching and routing of the calls or data requires reliable recognition and detection of the individually generated tones. As is generally known, each of these tones comprises unique combinations of signals of two different frequencies, the resultant tone signals having characteristic complex waveforms.

The conventional technique and apparatus for identifying and recognizing each of these tones employs analog circuitry which initially separates the two frequency signals of the complex waveform which are thereafter separately detected. Among the disadvantages associated with this prior art approach is the requirement of a large number of individually adjustable high and low pass filters to separate the two frequencies, and the consequent overall complexity and expense of such systems.

It is therefore a principal object of the present invention to provide a new and improved process and apparatus for selectively isolating and identifying signals of known characteristics from a group of signals of unknown characteristics.

It is another object of the present invention to provide apparatus for detecting and identifying electrical signals having characteristics complex waveforms.

It is another object of the invention to provide apparatus for effectively detecting and identifying the presence of specific tone signals generated from a TOUCH-TONE generator in a manner which does not require that the component frequencies thereof be separated.

It is a still further object of the invention to provide a new and improved signal detection system which converts analog signals of unknown waveform characteristics into digitally encoded signals, which signals are then uniquely electronically inspected to determine the presence of signals of known waveform characteristics.

It is another object of the invention to provide a new and improved digital signal detection system.

In accordance with these and other objects, the present invention is directed to a method and apparatus for detecting the presence of one or more signals of known waveform characteristics by initially comparing the format of digitally encoded signals of unknown characteristics generated from a signal source with prespecified digital formats representative of signals of known characteristics, and thereafter indicating the presence of the signals sought to be detected when there is a match or correlation with the prespecified formats. More specifically, the comparator portions of the digital detection system are internally configured to define "masks" respectively representative of the complex waveforms of the signals to be detected, "detect" pulses being generated and counted when any of the digitally encoded signals inputted to the comparators match the characteristics of these masks. The apparatus is uniquely designed to detect the presence of specific tones generated from a TOUCH-TONE signal generator by recognizing the entire complex waveforms thereof without first requiring the separation of these complex waveforms into their component frequencies.

Additional features, objects, and advantages of the invention will become apparent by reference to the following detailed description taken in conjunction with the accompanying drawings, in which.

Figure 1:
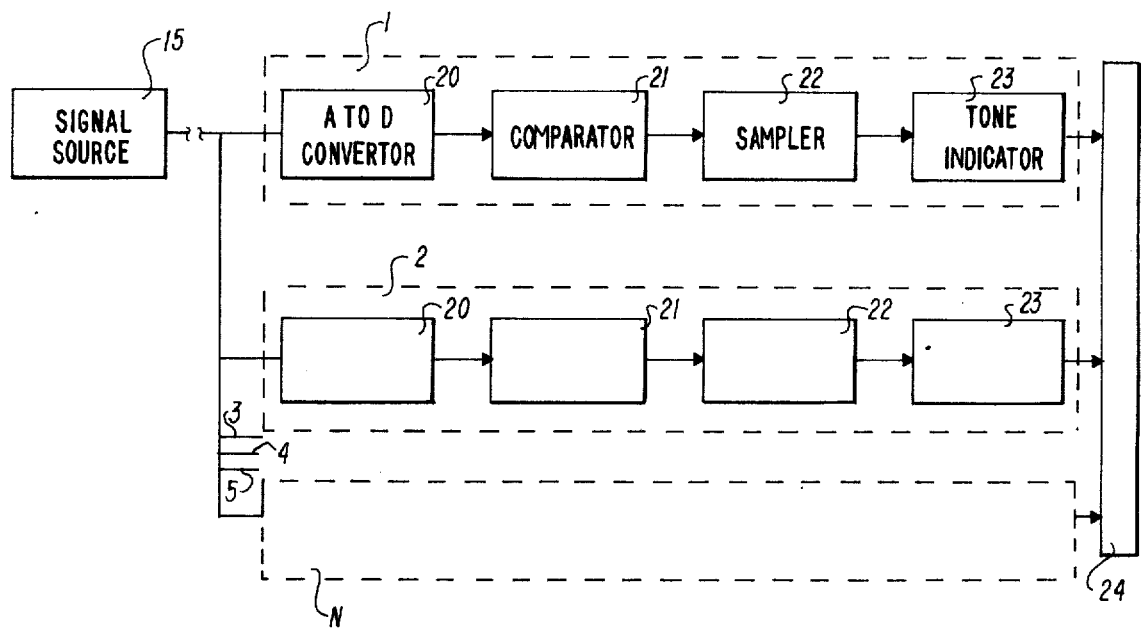
FIG. 1 is a block diagram schematic of a first preferred embodiment of the overall signal detection system of the present invention.

Referring initially to FIG. 1, a first preferred embodiment of the signal detection system of the present invention is depicted. Accordingly, the signal detection system is effective to selectively detect and identify electrical signals having particular known characteristics from a group of signals of unknown characteristics which are generated from a signal source 15. While this detection system is broadly suited for selectively identifying and detecting the presence of certain signals emanating from any type of a signal source, it has particular application where the source 15 is a TOUCH-TONE dial input for a telephone system or the like. As is generally known, selective depression of the buttons of a TOUCH-TONE dial generates characteristic tones therefrom, each of these tones comprising a different combination of two frequencies, the resultant analog signal having a unique complex waveform. For example, the waveform of the analog signal 16 depicted in FIG. 2A could be that of the dual frequency tone signal representing one of the 10 digits (0 through 9) of the TOUCH-TONE telephone dial, the nine other tones being respectively represented by uniquely different complex waveforms. As subsequently described, the present detection system then identifies the presence of a particular tone by recognizing and distinguishing its unique waveform from the waveforms of the other tones or signals inputted thereto.

Referring again to FIG. 1, the heart of the overall detection system of the present invention is a signal detection network 1 comprising a converter 20 for generating digital signals representative of the analog signals received from the signal source 15; a comparator 21 for generating a signal pulse at its output whenever the digital format of the signals received from converter 20 conforms to a prespecified digital format representing the known waveform characteristics of one cycle of the tone sought to be detected; a sampler 22 for monitoring the signal status at the output of comparator 21 during a prescribed time period to detect the occurrence of a predetermined minimum number of pulses from comparator 21 within such prescribed time period (corresponding to additional cycles of the tone and thus authenticating the "match"); and a tone indicator 23 generating a signal at its output in response to sampler 22 indicating the presence of said predetermined number of pulses, thus signaling the presence of the detected tone. The output signal from the tone indicator 23 could then operate appropriate utilization apparatus 24 which, in the case of a telephone system, could be a communication switching system selectively responsive to the various tone signals.

In the preferred embodiment depicted in FIG. 1, the analog signals received from the signal source 15 would be imputted not only to the signal detection network 1, but also to additional networks 2, 3, . . . N having the same configuration as the network 1, but which comparators 21 are respectively configured to identify prespecified digital formats characteristic of the other tones. As may be apparent, the total number N of such networks would depend upon the number of tone signals sought to be identified; and in the case of the TOUCH-TONE telephone dial, there would be 10 such networks for selectively detecting the tones corresponding to the digits 0 through 9.

The details and operation of the signal detection network 1 are now described, it being understood that such description would also apply to each of the detection networks 2, 3, etc. Accordingly, and with reference now to FIG. 3, each of the signals from the TOUCH-TONE generator 15 are received at the input terminal A of the analog-to-digital converter 20, which is then effective to produce a digital signal at its output terminal B uniquely characteristic of the waveform of the analog signals inputted thereto.

Various types of circuitry presently known in the art may be employed for the converter 20 to provide this digitally coded representation of the analog signals including, for example, conventional peak detectors which produce digital pulses representative of the maximum and minimum points of the analog waveform. In the present application, however, since the respective waveforms of the tone signals sought to be identified would have unique "zero crossing" characteristics, it is advantageous to employ a conventionally designed operational amplifier for the converter 20 which produces a square wave output pattern which is high (+1) when the analog signal excursion goes positive and low (0) when the analog signal excursion is negative. Thus, for the analog signal 16 depicted in FIG. 2A, the digital signal at the output terminal B would have the waveform 30 depicted in FIG. 2B.

Figure 2:
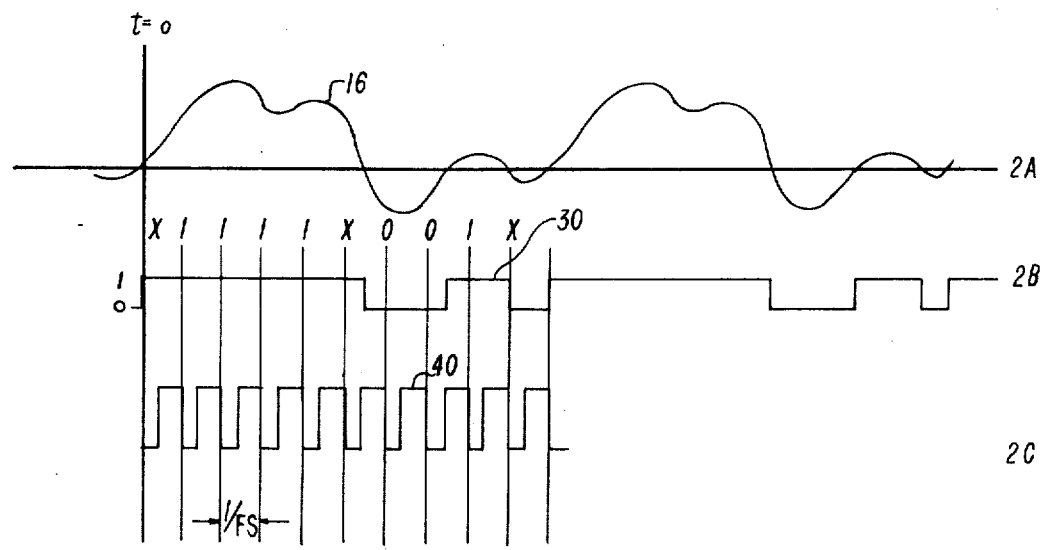
FIG. 2 illustrates the signal waveforms respectively representative of an analog signal to be detected (2A); the digitally encoded signal of the aforementioned analog signal (2B); and the clock pulse train of the shift register forming a part of the comparator portion of the signal detection system (2C)

Assuming that the detection network 1 is to recognize the presence of a tone signal having the waveform 16, the comparator 21 is internally configured to produce a "detect" pulse at its output terminal C when the format or pattern of the digital signals from the amplifier 20 conforms to the digital waveform 30 of FIG. 2B. The comparators 21 of the other detection networks 2, 3, . . . N would similarly be respectively configured to produce detect pulses when the digital signals appearing at terminal B conform to the digital pattern representative of other tone signals (which would, of course, have different zero crossing characteristics).

Referring again to FIG. 2B, it is observed that the portion of the digital signal 30 representing one complete cycle of the tone signal 16 can be divided into equal time segments 1/FS which, as subsequently described, constitute the sampling rate of this digital signal. These segments can be appropriately labeled with a 1 or 0 indicating the high or low status of the signal at the particular time. Additionally, an X (or don't care) can be assigned to certain segments of the signal to take into consideration anticipated frequency, amplitude, or phase distortions of the signal 16. Thus, starting at the time period $t = 0$ (the initiation of a cycle of the wave 16), the digital signal 30 can be characterized by the designation or mask X 1 1 1 1 X 0 0 1 X.

The comparator 21 is then constructed of digital circuitry which simulates the aforementioned mask. For example, in a preferred form of such circuitry illustrated in FIG. 3, the comparator is formed by a shift register 70 comprising a plurality of stages of interconnected JK flip-flops 50 - 59 having the clock pulse pattern 40 depicted in 2C at the clock rate FS. The respective outputs of the JK flip-flops (Q or $\bar{Q}$) are connected as the inputs to a conventional AND gate 60 in a manner which enables the gate 60 to produce a detect signal at its output C whenever the pattern of digital signals stored within the shaft register conforms to the specified pattern or mask of the signal 30.

Specifically, each of the stages of the shift register 70 would be assigned a symbol (0, 1, or X) to correspond to the state of the signal that would appear at its output Q when the digital pattern stored within the register conforms to the X 1 1 1 1 X 0 0 1 X pattern of signal 30. Since the digital signal 30 would be serially inputted to the shift register 70 and shifted through the various stages with each clock pulse, it is believed apparent that the symbols assigned to the respective flip-flops 50 - 59 would actually form a pattern (from left to right) designated X 1 0 0 X 1 1 1 1 X, which is the reverse of the mask pattern of signal 30.

Figure 3:
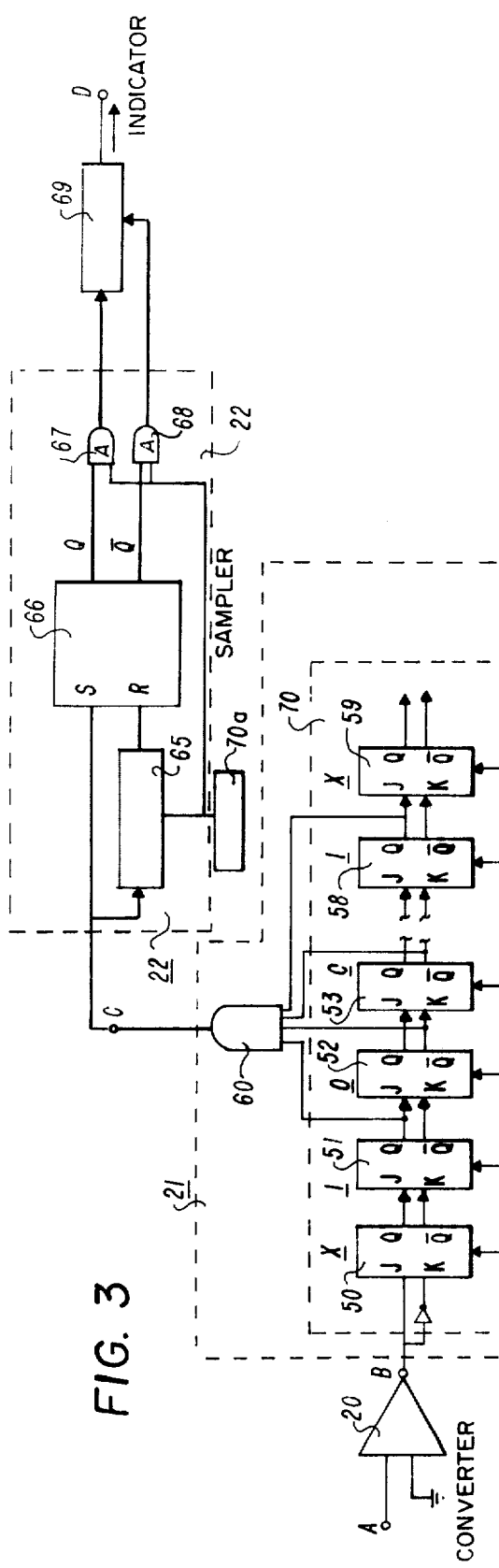
FIG. 3 is a more detailed schematic of the portions of the system depicted in FIG. 1.

Either the output Q or its complementary output $\bar{Q}$ of each stage would then be connected to the AND gate 60 in the manner illustrated in FIG. 3 to operate same whenever the respective signal states at the Q output of stages 50, 51, 52, etc., are X 1 0 0 X 1 1 1 1 X. Since the AND gate 60 produces a signal at its output only upon the occurrence of all 1's at its input, the complementary output Q would be chosen for those stages designated by a 0. Furthermore, as depicted in FIG. 3, where an X or don't care condition is designated, then neither of the outputs from that particular stage would be coupled to the AND gate 60.

The length of the shift register 70 (number of flip-flop stages) and the sampling or clock rate FS thereof is so chosen so as to guarantee that a time segment at least equal to the period of one cycle of the signal 16 is contained in the register. In the case where the signal source 15 is a TOUCH-TONE signal generator, the component frequencies of the tone signals are such that they are normally not harmonically related, i.e., have no common divisor; thus, the resulting waveforms of these signals have a period of one second. When detection on a period of this length may not be practical, it is possible to prespecify the mask for a simulated dual frequency signal having a shorter period but which, as a practical matter, is indistinguishably similar to the actual tone signal. For example, if the tone signal sought to be detected actually comprises frequencies respectively equal to 770 Hz and 1209 Hz, then the prespecified mask could be constructed for a simulated dual frequency signal of 770 Hz and 1210 Hz. Thus, the resulting waveform of this latter simulated signal would repeat 110 times a second or with a period of approximately 9.09 milliseconds. Detection of this TOUCH-TONE signal, and construction of the shift register 70, would then be effected in accordance with this time interval.

It is thus observed that whenever a digital signal having a format conforming to the prespecified digital format of one cycle of the tone signal 16 is stored within the shift register 70, the AND gate 60 will generate a detect pulse to sampler 22. The sampler network 22 is effective to verify that the tone signal 16 is actually present, and that the detect pulse from comparator 21 has not been falsely generated by other signals, noise, etc. In this regard, advantageous use is taken of the fact that the tone signal sought to be detected, if actually present, would persist for a considerable number of cycles; and there should therefore be a number of detect pulses successively generated from the comparator 21.

Accordingly, and for this purpose, the output of the AND gate 60 (FIG. 3) is coupled not only to the set input S of a conventional digital latch 66, but is also connected to the input of a conventional digital counter 65, the output of which is connected to the reset input R of the latch 66. The initial detect signal from comparator 21 will not only set the latch 66 to generate a 1 at its output Q, but will also reset the digital counter 65 (which is appropriately clocked from a clock source 70a) to count the number of detect pulses being received. If, during a prescribed time period, a minimum number of detect pulses are not received from comparator 21 (AND gate 60), the counter 65 will reset latch 66, removing the output signal at terminal Q (thus generating the pulse at the complementary output $\overline{Q}$).

The respective outputs from the latch 66 are connected as one input to AND gates 67 and 68, the other input to each of such AND gates being from the clock source 70a. The outputs from the AND gates 67 and 68 are respectively coupled as the inputs to a counter 69, a signal at the output of AND gate 68 being effective to reset counter 69.

Thus, as may be apparent, whenever a predetermined minimum number of pulses are generated at the output of AND gate 60 (representing succeeding cycles of the detected tone) during the prescribed time period (established by the clock rate of clock source 70a) the resulting pulses derived from the AND gate 67 to the counter 69 will be effective to generate a signal at the output D of the counter 69, thus indicating and confirming the presence of the tone sought to be detected.

As previously described, the signal detection system in accordance with the preferred embodiment of FIG. 1 would employ a comparator of the type 21 depicted in FIG. 3 in each of the signal detection networks 1, 2, 3, . . . N. In such instance, the mask defined by each comparator would be different, the inputs to the AND gate 60 of each comparator being so connected to the outputs of the stages 50 – 59 to generate a detect pulse only upon recognition of the digital format characteristics of the tone that that particular signal detection network is to identify.

Figure 5:
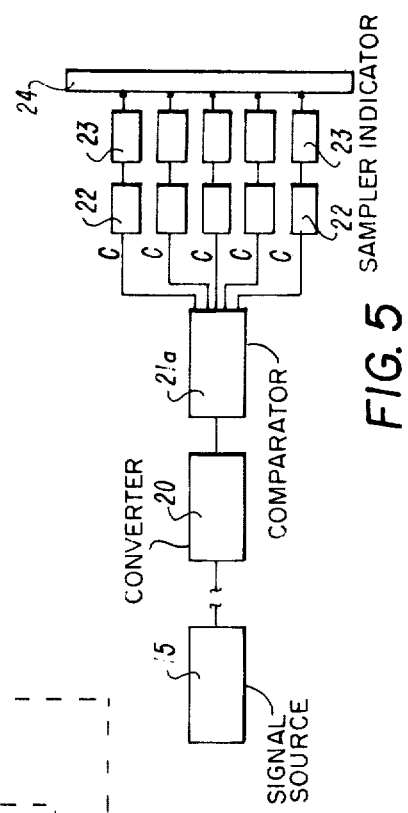
FIG. 5 is a block diagram schematic of a second preferred embodiment of the overall signal detection system of the present invention utilizing the comparator depicted in FIG. 4.
Figure 4:
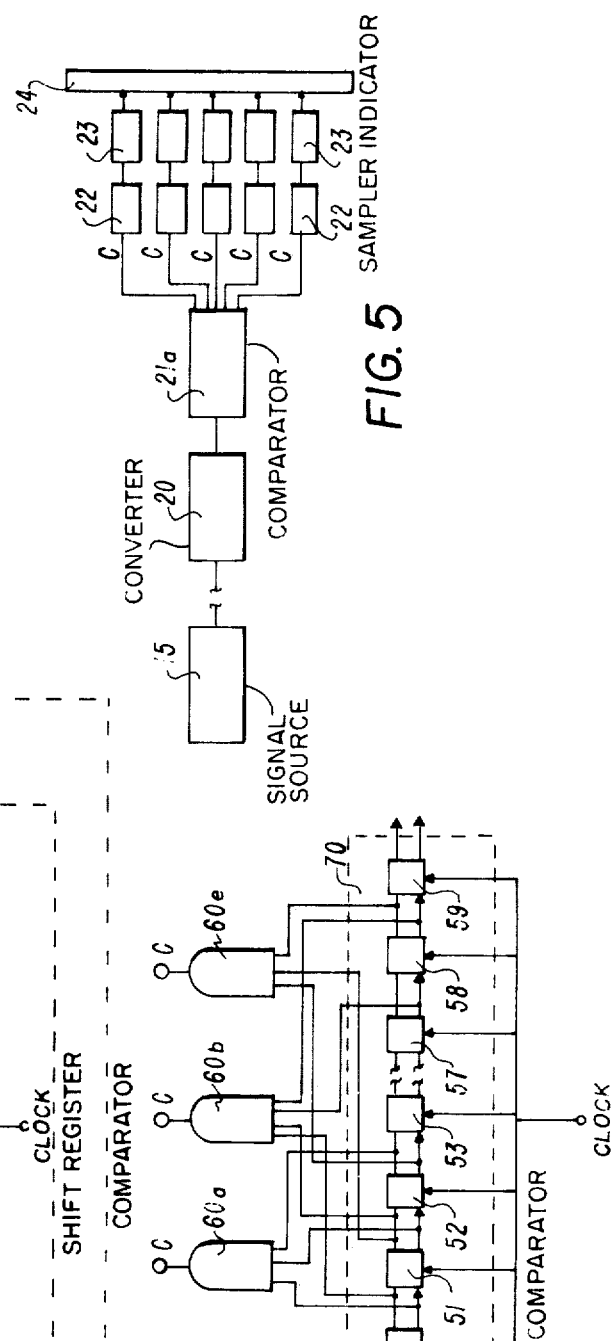
FIG. 4 is an alternate form of the comparator portion of the signal detection system.

As an alternative approach, the comparator can be configured in the manner depicted in FIG. 4 (and which, for convenience, has been designated therein by the reference numeral 21a). Accordingly, the comparator 21a would include a single shift register 70 having the appropriate number of stages 50 – 59 and a plurality of AND gates 60a, 60b, . . . 60e, which inputs are appropriately interconnected with the outputs from the shift register stages to generate detect pulses at their respective outputs C in accordance with the different tone signals (in this instance, five) being detected. Thus, only one comparator is required; and the overall detection system can then have the form depicted in FIG. 5 with redundancy being required only for the sampler and tone indicator portions 22 and 23.

Various modifications to the disclosed embodiments, as well as alternate embodiments, may become apparent to one skilled in the art without departing from the spirit and scope of the invention as defined by the appended claims.

What is claimed is:

1. Electronic signal detection apparatus for detecting the presence of a complex waveform analog signal of known waveform characteristics from a source of signals of unknown waveform characteristics, said apparatus comprising:
   a. converter means coupled to said source for generating digital signals having digital formats respectively representative of the waveform characteristics of each of said signals of unknown waveform characteristics;
   b. comparator means coupled with said converter means and comprising first means defining a prespecified digital format representative of said known waveform characteristics, and second means generating a detect signal when the digital format of one of said digital signals matches said prespecified digital format;
   c. indicator means generating a signal at its output in response to said generated detect signal, and
   d. sampler means coupled between said comparator means and said indicator means for preventing the generation of a signal from said indicator means except upon the occurrence of a minimum number of detect signals from said second means during a prescribed time period.

2. The apparatus as defined by claim 1 wherein said minimum number of detect signals represent different cycles of said complex waveform analog signal.

3. Apparatus for selectively detecting the presence of specific dual frequency TOUCH-TONE signals from a source of incoming signals of unknown characteristics, said apparatus comprising:
   a. convertor means for generating digital signals having respective digital formats representative of the waveform characteristics of each of said incoming signals,
   b. first digital circuit means for defining a plurality of prespecified digital formats respectively representative of the waveform characteristics of each of said dual frequency TOUCH-TONE signals to be detected,
   c. means comparing the digital formats of the generated digital signals with said plurality of prespecified digital formats and for generating a detect pulse whenever the digital formats of said generated digital signals matches one of said plurality of prespecified digital formats,
   d. second digital circuit means for counting the number of detect pulses which are generated within a prescribed time period, and e. indicator means responsive to generate a signal indicating which of said plurality of prespecified digital formats have been matched, said indicator means generating the signal solely in response to the said number of detect pulses exceeding a predetermined amount.

4. The apparatus as defined by claim 3 wherein said convertor means generates digital signals representative of the zero crossing waveform characteristics of said incoming signals.

5. The apparatus as defined by claim 4 wherein said first digital circuit means comprises shift register means having selected outputs therefrom connected with AND gate means.

6. The apparatus as defined by claim 5 wherein said first digital circuit means comprises a plurality of shift registers, the number of which corresponds to the number of TOUCH-TONE signals to be detected.

7. The apparatus as defined by claim 5 wherein said first digital circuit means comprises a single shift register, the outputs of which are connected to a plurality of AND gates, the number of AND gates corresponding to the number of TOUCH-TONE signals to be detected.

8. A method for detecting the presence of signals of known complex waveform characteristics from a source of signals of unknown waveform characteristics, said method comprising:
   a. converting the signals from said source to digital signals having formats representative of the waveform characteristics thereof, and
   b. comparing said formats with the pre-specified digital formats representing said signals of known complex waveform characteristics,
   c. indicating when said first mentioned formats match any one of said pre-specified digital formats, and
   d. counting the number of said matches within a prescribed time period.

* * * * *